United States Patent [19]

Blangetti et al.

[11] Patent Number: 5,067,446
[45] Date of Patent: Nov. 26, 1991

[54] APPARATUS FOR DEGASSING AND HEATING WATER

[75] Inventors: Francisco Blangetti, Baden; Werner Muri, Baden-Rütihof; Mustafa Youssef, Zürich, all of Switzerland

[73] Assignee: Asea Brown Boveri Ltd., Baden, Switzerland

[21] Appl. No.: 599,039

[22] Filed: Oct. 17, 1990

[30] Foreign Application Priority Data

Oct. 31, 1989 [CH] Switzerland ............... 3933/89

[51] Int. Cl.⁵ ................ F22D 1/30; F22D 1/29; F22D 1/26; B01D 47/00
[52] U.S. Cl. ................ 122/441; 122/442; 122/443; 122/32; 55/196; 55/223; 55/257.1; 261/76
[58] Field of Search ............ 122/441, 442, 443, 32; 261/D19, D32, 76, 98, 115, 118, 147; 55/36, 53, 54, 38, 196, 223, 238, 257.1

[56] References Cited

U.S. PATENT DOCUMENTS

| 572,955 | 12/1896 | Bonar | 122/443 |
|---|---|---|---|
| 1,511,876 | 10/1924 | Ehrhart . | |
| 2,722,920 | 11/1955 | Arrowsmith | 122/442 X |
| 2,838,135 | 6/1958 | Pilo et al. | 261/147 X |
| 4,193,776 | 3/1980 | Wasala et al. | 55/54 X |
| 4,265,167 | 5/1981 | Mojonnier et al. | 55/196 X |
| 4,338,100 | 7/1982 | Wersosky et al. | 55/38 X |
| 4,460,552 | 7/1984 | Zakrzewski | 261/8 X |
| 4,698,076 | 10/1987 | Bekedam | 55/196 X |
| 4,759,315 | 7/1988 | Chiou et al. | 122/442 |

FOREIGN PATENT DOCUMENTS

| 0123986 | 11/1984 | European Pat. Off. | 122/443 |
|---|---|---|---|
| 2130248 | 12/1972 | Fed. Rep. of Germany . | |
| 1229511 | 5/1986 | U.S.S.R. | 122/441 |
| 1275184 | 12/1986 | U.S.S.R. | 122/441 |
| 1477975 | 5/1989 | U.S.S.R. | 122/441 |
| 2132502 | 7/1984 | United Kingdom . | |

OTHER PUBLICATIONS

Lueger, vol. 16, "Lexicon of Process Engineering", p. 51.

Primary Examiner—Henry A. Bennett
Assistant Examiner—Christopher B. Kilner
Attorney, Agent, or Firm—Oblon, Spivak, McClelland, Maier & Neustadt

[57] ABSTRACT

An apparatus for degassing and heating water by means of steam comprises a column (1) with packing bodies (2) arranged therein, with a distributor (12) arranged at the column head for the water to be degassed, with a water supply line (7) and steam supply line (8) in each case arranged upstream of the column, with a water outlet line (19) and venting line (18) in each case arranged downstream of the column for the gas/steam mixture to be exhausted. The four lines open into housings (3, 14) which are connected above and below the preferably cylindrical column to the latter. A conical mixing chamber (4) into which the water to be degassed is injected via nozzles (6) is provided upstream of the distributor. The conical mixing chamber has an outer boundary wall (5) which is surrounded by a steam distribution chamber (9) and communicates with the latter via slot-type openings (10) in the boundary wall.

4 Claims, 1 Drawing Sheet

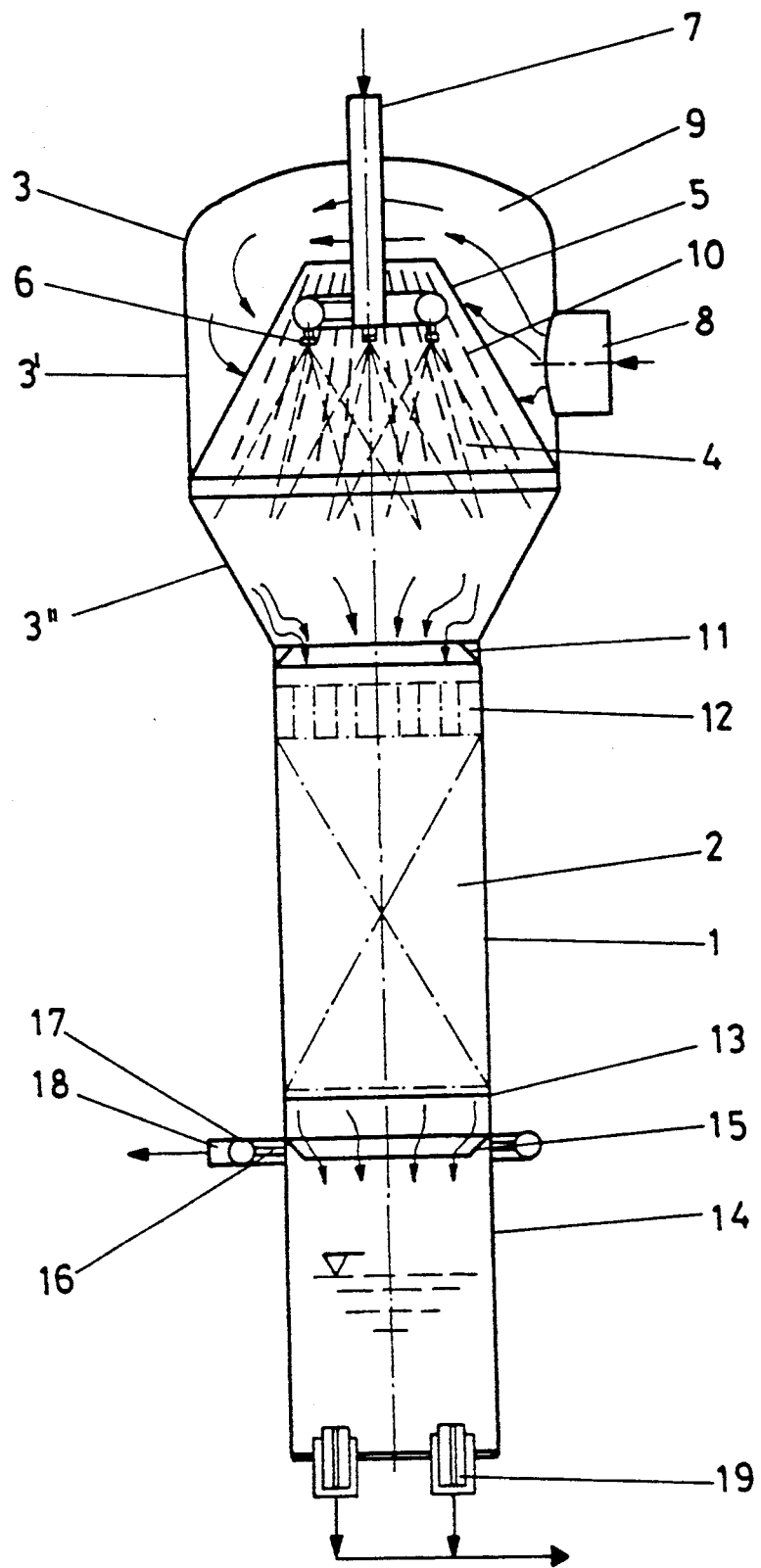

APPARATUS FOR DEGASSING AND HEATING WATER

BACKGROUND OF THE INVENTION

1. Field of the Invention

The invention relates to an apparatus for degassing and heating water by means of steam, essentially comprising a column with packing bodies arranged therein, with a distributor arranged at the column head for the water to be degassed, with a water supply line arranged upstream (at the head) of the column, with a water outlet line arranged downstream (at the bottom) of the column, and also a steam supply line and a venting line for the gas/steam mixture to be exhausted, the four lines opening into housings which are connected above and below the preferably cylindrical column to the latter.

Such apparatuses can be used in power station construction, in particular for degassing the feed water. In modern power station systems, particularly in the case of the combined cycle types, the consumption of treated water is very large. The conventional condensation systems, for example, require as make-up water normally 1 to 2%, based on the mass flow circulating in total, of the steam/condensate circulation. In combined cycle systems embodying steam injection to reduce the emission of nitrogen oxides, this percentage rises to 15% and still higher.

Another important case is represented by those systems which produce process steam. The condensate flowing back from heat exchangers, reactors, heaters etc. generally contains large amounts of dissolved air since the condensate has frequently come into contact with air in open channels and storage tanks. In not a few cases, even rainwater is also added.

The conventional degasser—as a rule combined with storage tanks—is little suited for achieving this object.

2. Discussion of Background

Known in connection with the degassing of liquids are exchange towers, also termed columns (LUEGER, volume 16, Lexikon der Verfahrenstechnik [Lexicon of Process Engineering], fourth edition, Deutsche Verlags-Anstalt, Stuttgart, page 51). These are as a rule cylindrical tubes in which the steam and the liquid of a mixture are fed to one another in countercurrent or in cross-countercurrent. Inter alia, so-called packing body columns, which contain packing bodies deposited regularly or irregularly inside the tower jacket are used. In these, the liquid and the steam of a mixture to be separated are fed to one another in countercurrent in a manner such that both phases make as intimate contact as possible with each other for the purpose of mass transfer and for the purpose of heat exchange.

The use of a packing body tower connected in countercurrent is in principle correct—for the purpose of achieving a maximum separative work at a particular packing body height. However, with a countercurrent connection, the presence of a fairly large supercooling entails the problem that a very large proportion of the steam has to surmount the lower part of the tower (flooding of the packing) without significant effect for the substance-kinetic separative work which occurs in the lower part of the tower since the condensate heating and saturation process take place in practice in the upper part. The consequence of such a design solution is, however, that the diameter of the tower has to be very large to prevent flooding of the packing, with appreciable additional costs for the apparatus.

SUMMARY OF THE INVENTION

Accordingly, one object of this invention is to provide a novel high-performance degasser which brings the supercooled water to be degassed into contact with steam without significant pressure loss so that the regeneration of the supercooling and the removal of all the dissolved gases—essentially nitrogen, oxygen and carbon dioxide—are achieved.

According to the invention, this is achieved by an apparatus wherein the steam supply line and the venting line open into the appropriate housings upstream and downstream of the column respectively;

wherein a conical mixing chamber into which the water to be degassed is injected via nozzles is provided upstream of the distributor;

and wherein the boundary wall of the conical mixing chamber is surrounded by a steam distribution chamber and communicates with the latter via openings in the boundary wall.

This novel apparatus is not intended primarily as a replacement for the conventional mixer preheater/degasser—although this could also be the case in some situations—but, on the contrary, as a supplement to it. Very particularly, it can be used as a preliminary degasser for, for example, rainwater.

The novel type of degasser has the following advantages:

It offers the possibility of greater heating of the water without the risk of the flood limit which can be reached in the conventional types of degassers (i.e. in countercurrent, steam introduction below the packing). This ensures a stable hydraulic behavior for fairly large heating steam flows.

It has a compact construction and requires a lower packing volume than a conventional countercurrent connection.

It operates without appreciable pressure losses.

It is particularly expedient if the conical mixing chamber has a larger diameter on the exit side than the column and if the injection angle of the water to be injected into the mixing chamber is at least approximately equal to the cone angle of the boundary wall. This achieves the result that the water droplets sprayed in by the nozzles essentially retain their size, i.e. that no drop coalescence takes place.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein an exemplary embodiment of the invention is shown which is based on a mixer preheater/degasser for power station application. The sole figure shows diagrammatically a longitudinal section through a vertically arranged degasser. The directions of flow of the working media are denoted by arrows.

DESCRIPTION OF THE PREFERRED EMBODIMENT

Although mixer preheaters/degassers are sufficiently known in structure and function, their problems may be briefly explained here: the degassing accompanied by simultaneous heating, such as occurs typically in power station systems, is distinguished by a few special features. First of all, saturated low-pressure steam, whose temperature is normally in the region of 100° C., is available for heating. Furthermore, for the purpose of an optimum utilization of the heat, throttling of the steam and consequently reduction of the associated saturation temperature is not permissible. The consequence of this is the steam mass flow exhausted from the supercooled condensate and due only to the supercooling and the mass flow of the condensate. In other words, a natural steady state which depends only on the states and the intensity of the flows involved without the interference of a regulating circuit to control the active quantities mentioned is established in the degasser.

The expulsion of the gases dissolved in the condensate occurs initially on a purely thermodynamic basis since the reduction in the pressure due to spraying and the increase in the temperature of the condensate due to heating with steam causes a reduction in the saturation values of the dissolved gases (thermomechanical effect), as a result of which the partial pressure of the dissolved gases exceeds the prevailing total pressure. The decisive portion of the degassing occurs, however, normally on a purely substance-kinetic basis due to diffusive transport of the dissolved gases across the gas/liquid boundary layer. This transport process can only take place after a thermal equilibrium has been reached.

The removal of the gases contained in the gas phase can only be possible if a portion of the steam fed in and enriched with the expelled gases is let down into a vessel at a lower pressure—normally to the condenser ("purging" or "venting").

The construction and operation of such degassing apparatuses in relation to these problems are known to this extent.

According to the invention, a cocurrent connection has now been chosen since this is substantially insensitive to packing flooding. At the same time, some disadvantages of cocurrent connection are consciously accepted in order to favor the flow-dynamic behavior of the degassing with coupled heating. In this connection, the achievable high value of the desorption coefficients should be emphasized.

Referring now to the drawing, the apparatus is made up essentially of the following parts:

A cylindrical column 1 contains layered packing bodies 2, hereinafter termed packing. The latter may be a bed, that is to say a so-called unordered packing (random packing). Better suited is an ordered packing (regular packing) which offers the advantages of a higher separating performance at lower pressure drop due to homogeneously controlled distribution. As a material for such packings, which are known per se, use can be made of stainless steel, ceramic or plastic fabric, which are all distinguished by a good wettability in the case of aqueous systems. The packing is kept in the column, at least at the lower end thereof, by a packing grid 13.

Mounted on the vertically erected column 1 is a housing 3 having larger diameter. It terminates at the top with a dome. The upper section 3' is of cylindrical shape, while the lower section 3" is tapered for the purpose of matching to the diameter of the column. Inserted inside the cylindrical housing part 3' is a conical mixing chamber 4, the larger diameter of the boundary wall 5 thereof being flush with the housing 3, in particular at the point where the cylindrical section merges into the tapered section.

In the region of the smaller diameter, a water injection system is arranged inside the conical boundary wall 5. This comprises annularly arranged spray nozzles 6 which are fed from a water supply line 7 which passes through the dome of the housing. The injection angle of the nozzles is preferably equal to the cone angle of the boundary wall 5. The supercooled water, in this case condensate with high $O_2$ concentration, is sprayed into the mixing chamber via said nozzles.

A steam supply line 8 opens laterally into the upper cylindrical section 3' of the housing. The steam distributes itself annularly in the steam distribution chamber 9 which is formed between housing wall and boundary wall 5. Provided in the boundary wall over the entire circumference and the entire height are openings 10 in the form of longitudinally directed slots. The steam which is used to heat and degass blows concentrically inwards through said slots into the mixing chamber and mixes with the supercooled injected condensate. As a result of the heating, which remains, however, below saturation for the pressure prevailing in the mixing chamber, some of the gases dissolved in the condensate are expelled (thermomechanical effect).

The condensate which runs downwards at the tapered walls is collected in a circumferential collar 11 and conveyed into the actual distributor 12 of the packing. Said collar serves to remove the water from the walls since this phenomenon can result in a reduction of the separative work of the packing (channeling). The distributor 12 is provided precisely above the packing 2. It is, as a rule, a channel system in which the heated water running down is collected and uniformly distributed over the cylindrical cross section of the column 1.

The water and the steam flow in cocurrent and in parallel downwards through a plurality of layers of the regular packing. In the packing, the residual supercooling of the water is eliminated, which requires only approximately 100 to 150 mm of packing. After thermal equilibrium has been reached, the degassing process takes place in the tower on a purely substance-kinetic basis.

The lower end of the column 1 is mounted on a second housing 14. At the deepest point thereof, two water outlet lines 19 are provided for the degassed and heated condensate. Accommodated under the packing grid 13 is a circumferential collar 15 which, together with the housing wall, forms an annular space which is protected from the condensate sprinkling downwards. This serves to remove the steam enriched with air. For this purpose, arranged on the wall of the housing 14 is a number of connecting tubes 16 which are connected to an annular pipe 17. Almost all of the dissolved gases are conveyed with a purging steam flow to an exhaust or condenser which is not shown by a venting line 18 connected to the annular pipe 17. The purging steam mass flow can be regulated by critical or subcritical diaphragms in the connecting tubes.

The mass flow of the exhaust mixture is regulated in a manner such that it is at least 1.5–2 times the minimum value for the purpose. This minimum value is determined from the equilibrium concentration in the gas phase to the desired exit concentration of oxygen in the condensate at the exit from the packing.

The typical working range of an apparatus according to the invention is a condensate mass flow of more than 10 kg/s and a heating of more than 20° C. with oxygen concentrations in the saturation range at normal pressure of 7,000-10,000 ppb at the entrance and about 50 ppb at the exit of the degasser. If the input concentration is reduced, the exit concentration can be reduced correspondingly to 5-10 ppb. Here ppb signifies "part per billion", which corresponds to $10^{-9}$ kg $O_2$/kg of condensate in the SI system of measurement.

It is obvious that it is necessary to refrain from specifying absolute values also in connection with the numerical values mentioned in relation to the dimensioning of the apparatus and, in particular, of the packing height since these values have in any case too little meaning because of their dependence on the all too numerous parameters. The only critical point for the design is that the heating of the water has to take place first, followed by the degassing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for degassing and heating water by means of steam, comprising:
    an upper housing comprising,
    a conical mixing chamber having a conical boundary wall,
    nozzles coupled to a water supply line by which the water to be degassed is injected within said conical boundary wall,
    a steam distribution chamber surrounding said conical mixing chamber and coupled to a steam supply line,
    said conical boundary wall of said conical mixing chamber having openings by which steam supplied into said distribution chamber communicates with water to be degassed supplied by said nozzles within said mixing chamber;
    a column with packing bodies arranged therein downstream of said upper housing, said column having a distributor arranged at a head of said column; and
    a lower housing communicating with and downstream of said column, including a venting link for exhausting gas/steam mixture and an output line for passing degassed and heated water.

2. The apparatus as claimed in claim 1, wherein the conical mixing chamber has a larger diameter on a downstream side of the mixing chamber than the column.

3. The apparatus as claimed in claim 1, wherein the openings in the boundary wall are of slot-type construction.

4. The apparatus as claimed in claim 1, wherein water is injected into the mixing chamber at an injection angle which is at least approximately equal to the cone angle of the boundary wall.

* * * * *